(12) United States Patent
Barry

(10) Patent No.: US 12,510,233 B2
(45) Date of Patent: Dec. 30, 2025

(54) CORRUGATED METAL CEILING SHROUD FOR CAN LIGHTING AND CEILING FANS

(71) Applicant: Daniel E. Barry, Bertram, TX (US)

(72) Inventor: Daniel E. Barry, Bertram, TX (US)

( * ) Notice: Subject to any disclaimer, the term of this patent is extended or adjusted under 35 U.S.C. 154(b) by 0 days.

(21) Appl. No.: 18/435,003

(22) Filed: Feb. 7, 2024

(65) Prior Publication Data

US 2025/0297729 A1    Sep. 25, 2025

Related U.S. Application Data

(60) Provisional application No. 63/446,319, filed on Feb. 16, 2023.

(51) Int. Cl.
| | |
|---|---|
| *F21V 21/03* | (2006.01) |
| *F21S 8/02* | (2006.01) |
| *H02G 3/08* | (2006.01) |
| *H02G 3/20* | (2006.01) |

(52) U.S. Cl.
CPC ............... *F21V 21/03* (2013.01); *F21S 8/026* (2013.01); *H02G 3/081* (2013.01); *H02G 3/20* (2013.01)

(58) Field of Classification Search
CPC .......... F21V 21/03; F21S 8/026; H02G 3/081; H02G 3/121; H02G 3/10; H02G 3/12; H02G 3/14; H02G 3/20; H02G 3/21
USPC ....... 362/147; 174/50, 66, 67, 480, 481, 491
See application file for complete search history.

(56) References Cited

U.S. PATENT DOCUMENTS

| | | | | |
|---|---|---|---|---|
| 6,806,426 B1 * | 10/2004 | Gretz | ....................... | H02G 3/14 174/67 |
| 2015/0131289 A1 * | 5/2015 | Speer | ....................... | F21K 9/65 29/829 |

* cited by examiner

*Primary Examiner* — Laura K Tso
(74) *Attorney, Agent, or Firm* — Womble Bond Dickinson (US) LLP

(57) ABSTRACT

The present invention is a plastic shroud for corrugated metal ceilings, which hides the gaps in the ceiling between a can light and conforms to the peaks and valleys of a corrugated metal ceiling. The core components of the invention are ABS or injection molded plastic, which, generally speaking, are configured as follows: {one solid piece that can be easily installed with the existing mounting hardware of a can light}. The invention can be used on different corrugated metal ceilings or walls for many different types of applications such as can lighting, ceiling fans, or other round objects. Furthermore, it should be noted that requires no additional hardware and installs in seconds with existing can light hardware from most can light manufacturers.

3 Claims, 4 Drawing Sheets

CORRUGATED METAL CEILING SHROUD FOR CAN LIGHTING AND CEILING FANS

BACKGROUND

1. Field of the Invention

The invention relates generally to corrugated metal ceiling shroud for can lighting and ceiling fans

2. Background

Currently, there are a number of solutions for {metal ceiling lighting}. Some of these solutions attempt to fill the gaps in metal celling corrugated gaps and are a professional solution, but these solutions fail to meet the needs of the industry because they don't fill the gaps correctly. Other solutions attempt to most solutions leave gaps and look poor in appearance, but these solutions are similarly unable to meet the needs of the industry because it does not fill the gaps in the metal ceiling. Still, other solutions seek to fill the gaps in the corrugated metal ceiling, but these solutions also fail to meet industry needs because they leave gaps.

SUMMARY OF THE INVENTION

It would be desirable to have a corrugated metal ceilings such as as the kind found inside many metal buildings which/that hides and seal the gaps and fills the peaks and valleys of corrugated metal ceilings. Furthermore, it would be desirable to have an aesthetic appeal as these: dress up metal ceiling lighting. Still, further, it would also be desirable to have a safe way to hide wires and seal gaps around water-prone areas such as baths, showers or other wet areas. The disclosed device advantageously fills these needs and addresses the aforementioned deficiencies by providing a safe and utilitarian way to fill the gaps in metal roofing around can lighting.

Disclosed is a corrugated metal lighting shroud, which is made up of the following components: ABS or rotomolded plastic housing. These components are ABS or Rotomolded Plastic Shroud Housing as follows: one piece design. The associated method Is made up of the following steps. Mounts with Lighting Bracket Hardware.

The device may also have one or more of the following: {N/A}.

The disclosed device is unique when compared with other known devices and solutions because it provides: (1) Ascetically pleasing; (2) Utilitarian; and (3) Safety Minded (Hides the Electrical Wiring).

The disclosed device is unique in that it is structurally different from other known devices or solutions. More specifically, the device is unique due to the presence of (1) Ridges and Valleys to Fill the gaps in the ceiling; (2) round fixture that fits the can light well; and (3) a way to hide wiring and is safety minded.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The Corrugated Metal Ceiling Shroud for Can Lighting and Ceiling Fans may, however, be embodied in many different forms and should not be construed as being limited to the embodiments set forth herein; rather, these embodiments are provided by way of illustration only and so that this disclosure will be thorough, complete and fully convey understanding to those skilled in the art.

DETAILED DESCRIPTION

Figure 1:
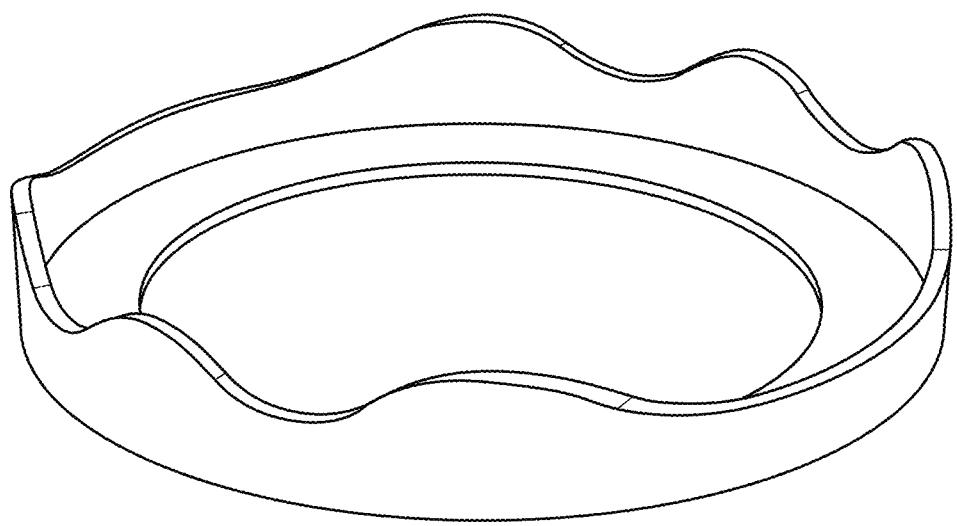
FIG. 1.—Top View of Metal Ceiling Light Shroud
FIG. 2.—Bottom View of Metal Ceiling Light Shroud
FIG. 3.—Light Mounted with Shroud on Corrugated Metal Ceiling
FIG. 4.—Side View of Metal Ceiling Light Shroud
Figure 2:
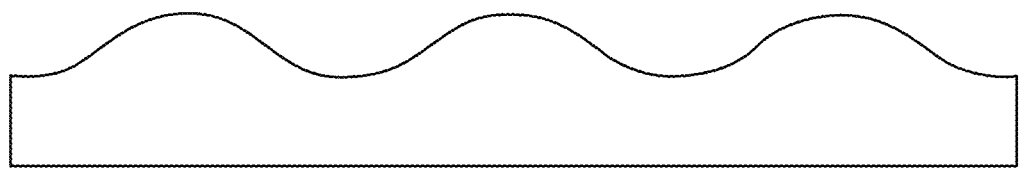
Figure 3:
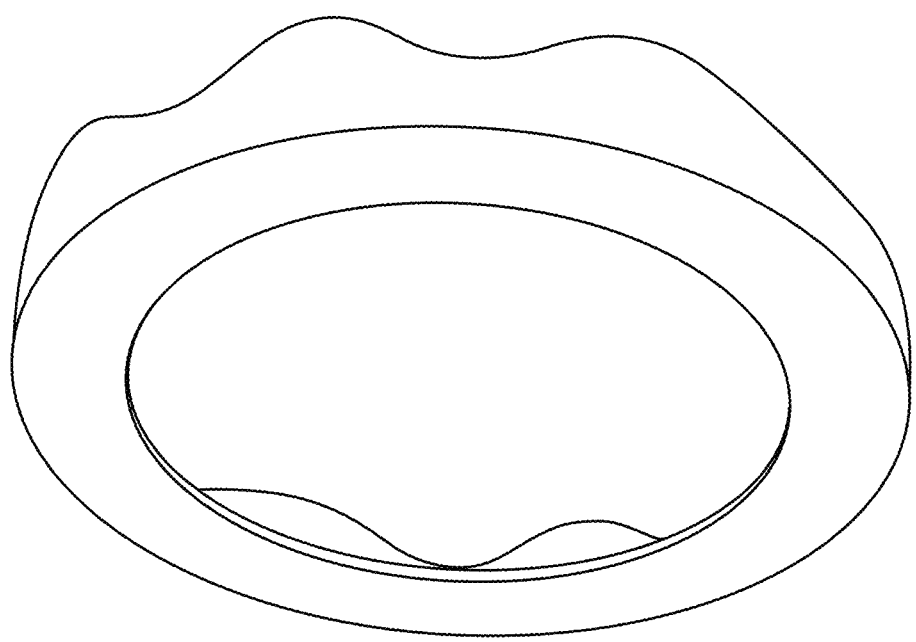
Figure 4:
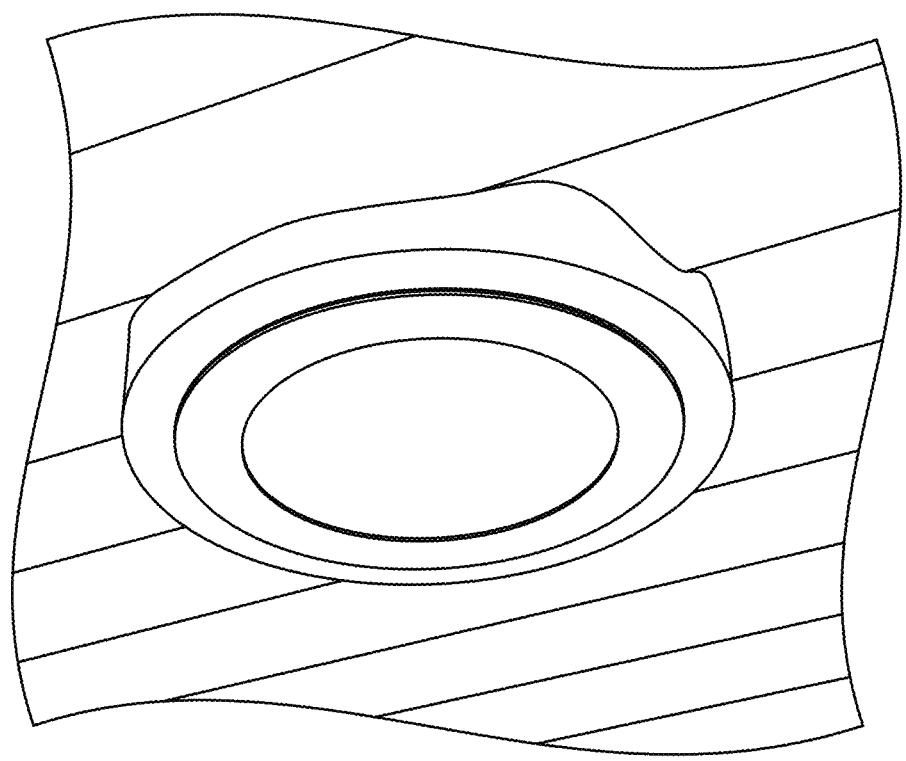

The present invention is directed to corrugated metal ceiling shroud for can lighting and ceiling fans In its most complete version, the device is made up of the following components ABS or Rotomolded Plastic. These components are one piece ABS plastic shroud}. It should further be noted that: shroud is mounted with lighting hardwared supplied by can lighting manufacturer.

Top view of shroud showcasing how it mounts to the ceiling, covering the ridges (peaks and valleys) of metal ceiling.

Bottom view of shroud showing how it would mount without a can light added.

Completely installed metal building shroud showing installed with the can light (Light NOT included).

Side view on the shroud showcases how it covers the gaps in the metal ceiling and fills the peaks and valleys.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. An electrical plate cover for a corrugated mounting surface, the plate cover comprising:
 a plate cover body have a top face cover and a bottom face, the bottom face to be positioned adjacent an electrical fixture when the electrical plate cover is positioned thereon;
 one or more peaks and one or more valleys extending around lower peripheries of the bottom face of the plate cover body; and
 one or more openings extending through the plate cover body from the top face cover to the bottom face, the one or more openings to provide exposure access to the electrical fixture.

2. The electrical plate cover as defined in claim 1, wherein the electrical fixture comprises an electrical light fixture.

3. The electrical plate cover as defined in claim 1, wherein the one or more peaks and the one or more valleys comprises a plurality of peaks and valleys substantially surrounding the one or more openings, and wherein the plate cover body and the plurality of peaks and valleys comprises a substantially rigid material.

\* \* \* \* \*